United States Patent [19]
Kondo et al.

[11] Patent Number: 5,685,386
[45] Date of Patent: Nov. 11, 1997

[54] DRIVEN WHEEL DIFFERENTIAL LIMITING APPARATUS FOR VEHICLE

[75] Inventors: Toshiro Kondo; Fumitaka Ando, both of Hatsukaichi; Yasuhiro Nakashima, Higashihiroshima; Takao Imada, Hiroshima, all of Japan

[73] Assignee: Mazda Motor Corp., Hiroshima, Japan

[21] Appl. No.: 570,253

[22] Filed: Dec. 11, 1995

Related U.S. Application Data

[63] Continuation of Ser. No. 128,683, Sep. 30, 1993, abandoned.

[30] Foreign Application Priority Data

| Oct. 5, 1992 | [JP] | Japan | 4-292233 |
| Oct. 5, 1992 | [JP] | Japan | 4-292234 |
| Oct. 5, 1992 | [JP] | Japan | 4-292235 |
| Oct. 5, 1992 | [JP] | Japan | 4-292236 |

[51] Int. Cl.$^6$ .................................................. B60K 17/16
[52] U.S. Cl. .................. 180/76; 180/197; 364/424.05; 303/146
[58] Field of Search ............... 180/76, 249, 248, 180/250, 305, 308, 197, 6.2, 6.24; 364/424.05, 424.1, 426.03; 303/146, 147

[56] References Cited

U.S. PATENT DOCUMENTS

| 3,706,351 | 12/1972 | Neisch ............................ 180/76 X |
| 3,795,408 | 3/1974 | Nemessanyi ...................... 180/76 |
| 5,206,808 | 4/1993 | Inoue et al. ..................... 303/146 X |
| 5,229,944 | 7/1993 | Yasuno ............................ 303/146 X |
| 5,341,296 | 8/1994 | Yasuno et al. ................... 303/146 X |
| 5,341,297 | 8/1994 | Zomotor et al. ................. 303/146 X |
| 5,428,532 | 6/1995 | Yasuno ............................ 303/146 X |

FOREIGN PATENT DOCUMENTS 61-94427  6/1986  Japan.

*Primary Examiner*—Kevin Hurley

[57] ABSTRACT

In a vehicle having a pair of right and left front wheels and a pair of right and left rear wheels, when the front wheels are driven wheels, a differential limiting mechanism such as a multi-disc viscous clutch is arranged between axle members coupled to axles of the front wheels via universal joints, or when the rear wheels are driven wheels, the differential limiting mechanism is arranged between axles of the rear wheels. The differential limiting force of the differential limiting mechanism is controlled on the basis of various physical quantities (a steering angle θh, a vehicle speed V, a brake hydraulic pressure P, a vertical acceleration G, and a road-surface μ) associated with the traveling state of the vehicle detected by sensors. Therefore, there can be provided a driven wheel differential limiting apparatus for a vehicle, which has high reliability and durability since the differential limiting force is controlled via, e.g., the viscous force of a fluid, and which can assure quick-turn traveling performance at a low vehicle speed, and can improve straight traveling stability in a high-speed traveling state since the degree of differential limiting is varied in correspondence with the traveling state of the vehicle.

26 Claims, 11 Drawing Sheets

DRIVEN WHEEL DIFFERENTIAL LIMITING APPARATUS FOR VEHICLE

BACKGROUND OF THE INVENTION

This application is a continuation of application Ser. No. 08/128,683, filed Sep. 30, 1993, now abandoned.

FIELD OF THE INVENTION

The present invention relates to a driven wheel differential limiting apparatus for a vehicle and, more particularly, to a driven wheel differential limiting apparatus, which is provided with a differential limiting mechanism for limiting a differential of right and left driven wheels of a vehicle to achieve differential limiting corresponding to a traveling state of the vehicle.

DESCRIPTION OF THE RELATED ART

In general, a vehicle has a pair of right and left driving wheels, and a pair of right and left driven wheels, and has a differential apparatus allowing a differential between the right and left driving wheels so as to achieve smooth turning. However, the right and left driven wheels are arranged to be independently driven by the road surface, and have no differential limiting apparatus for limiting a differential therebetween.

More specifically, the right and left driven wheels in a conventional vehicle merely achieve functions of supporting the weight of vehicle, assuring positional stability, assuring a braking force, and sharing a turning lateral force, and are not arranged to change steering characteristics or traveling characteristics of the vehicle via the right and left driven wheels.

Japanese Utility Model Laid-Open No. 61-94427 discloses an axle apparatus for a vehicle, in which a differential limiting means consisting of a multi-disc frictional clutch is arranged between the axles of the right and left driving wheels, and a differential limiting means consisting of a multi-disc frictional clutch is arranged between the axles of the right and left driven wheels as well so as to improve straight traveling stability.

However, in the axle apparatus for a vehicle disclosed in the above-mentioned reference, a differential limiting means consisting of a pre-loaded (constant torque) type multi-disc frictional clutch is not arranged to control the differential limiting force of the differential limiting means. For this reason, although straight traveling stability can be improved, and an understeering tendency can be strengthened, requirements opposite thereto cannot be satisfied. That is, the above-mentioned apparatus cannot be used in a practical application since it extremely impairs turning performance in a low-speed traveling state, lowers rough road traveling performance, or promotes an understeering tendency in an accelerated state of an FF vehicle which has a strong understeering tendency.

More specifically, according to the characteristics of the multi-disc frictional clutch, the multi-disc frictional clutch has a large differential limiting force in a region wherein the rotational speed difference between the right and left driven wheels is small, and has a small differential limiting force in a region wherein the rotational speed difference is large. Therefore, when a vehicle marks a quick turn at a low vehicle speed, since the rotational speed difference between the right and left driven wheels is small, and a large differential limiting force is generated, quick-turn traveling performance at a low speed is considerably lowered. In contrast to this, when a vehicle travels along a curved expressway, the rotational speed difference between the right and left driven wheels becomes large since the vehicle speed is high. In this case, however, since the multi-disc frictional clutch exhibits only a small differential limiting force, the straight traveling stability and the understeering tendency cannot be sufficiently improved.

In addition, the frictional clutch has poor reliability, and cannot be used in a practical application since its frictional characteristics largely vary due to wear, and its durability is lowered due to wear.

Furthermore, the above-mentioned apparatus merely improves the straight traveling stability by achieving understeering characteristics of a vehicle since the differential limiting means consisting of the multi-disc frictional clutch is not controlled at all. In addition, when the straight traveling stability is improved by strengthening the understeering tendency, turning performance is extremely lowered. In particular, since differential limiting corresponding to a frictional coefficient $\mu$ of the road surface cannot be achieved, it is difficult to assure turning performance or traveling stability when a vehicle travels along a low-$\mu$ road such as a snow-covered road.

SUMMARY OF THE INVENTION

It is an object of the present invention to provide a driven wheel differential limiting apparatus for a vehicle, which can vary the degree of differential limiting in correspondence with the traveling state of the vehicle.

In order to achieve the above object, according to a preferred aspect of the present invention, there is disclosed a driven wheel differential limiting apparatus for a vehicle having a pair of right and left driving wheels and a pair of right and left driven wheels, comprising: limiting means for limiting a differential between the driven wheels; detection means for detecting various physical quantities associated with a traveling state of the vehicle; and control means for controlling the limiting means on the basis of an output from the detection means so as to achieve differential limiting in correspondence with the traveling state of the vehicle.

It is another object of the present invention to provide a driven wheel differential limiting apparatus for a vehicle, which has high reliability and durability, can assure high quick-turn traveling performance at a low speed, and can improve straight traveling stability at a high vehicle speed.

In order to achieve the above object, according to another aspect of the present invention, there is disclosed a driven wheel differential limiting apparatus for a vehicle having a pair of right and left driving wheels and a pair of right and left driven wheels, comprising: limiting means for limiting a differential between the driven wheels via a viscosity or a fluid pressure of a fluid.

It is still another object of the present invention to provide a driven wheel differential limiting apparatus for a vehicle, which can relax differential limiting in correspondence with the turn degree of a vehicle.

In order to achieve the above object, according to still another aspect of the present invention, there is disclosed a driven wheel differential limiting apparatus for a vehicle having a pair of right and left driving wheels and a pair of right and left driven wheels, comprising: limiting means for limiting a differential between the driven wheels; detection means for detecting various physical quantities associated with a traveling state of the vehicle; and control means for controlling the limiting means on the basis of an output from the detection means so as to achieve differential limiting in correspondence with the traveling state of the vehicle, wherein the control means relaxes the differential limiting in correspondence with a turn degree of the vehicle detected by the detection means.

It is still another object of the present invention to provide a driven wheel differential limiting apparatus for a vehicle, which performs differential limiting in correspondence with a traveling state of the vehicle, and in accordance with a frictional coefficient μ of a road surface.

In order to achieve the above object, according to still another aspect of the present invention, there is disclosed a driven wheel differential limiting apparatus for a vehicle having a pair of right and left driving wheels and a pair of right and left driven wheels, comprising: limiting means for limiting a differential between the driven wheels; detection means for detecting various physical quantities associated with a traveling state of the vehicle; and control means for controlling the limiting means on the basis of an output from the detection means so as to achieve differential limiting in correspondence with the traveling state of the vehicle, wherein the control means relaxes the differential limiting in accordance with a decrease in frictional coefficient of the road surface detected by the detection means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A driven wheel differential limiting apparatus for a vehicle according to an embodiment of the present invention will be described in detail hereinafter with reference to the accompanying drawings.

FIRST EMBODIMENT

In this embodiment, a driven wheel differential limiting apparatus (to be referred to as a "differential limiting apparatus" hereinafter) according to the present invention is applied to a rear-wheel drive vehicle.

Figure 1:
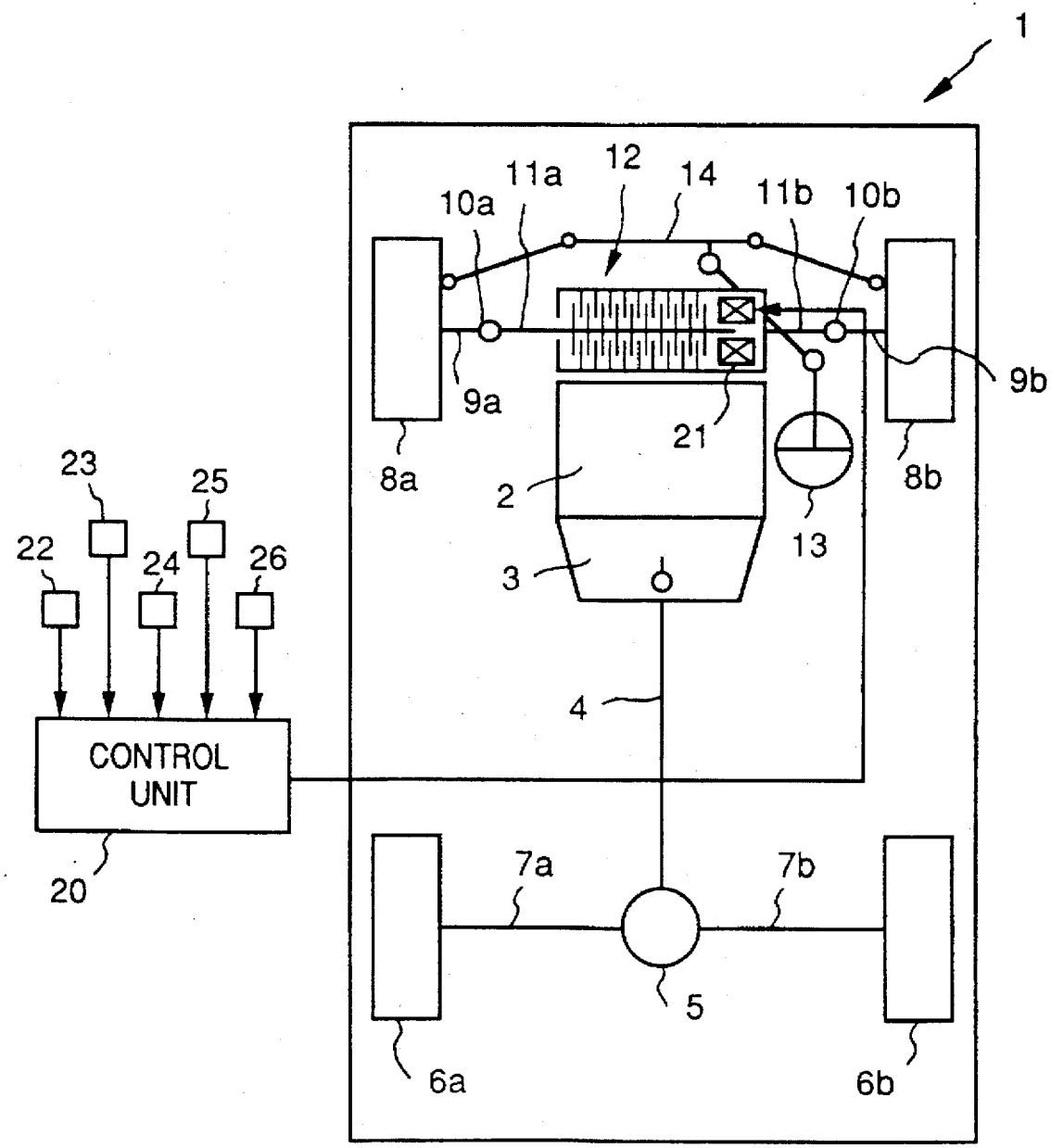
FIG. 1 is a schematic view showing an arrangement of a driven wheel differential limiting apparatus for a rear-wheel drive vehicle according to the first embodiment of the present invention.

As shown in FIG. 1, in a rear-wheel drive vehicle 1, an engine 2 and an automatic transmission 3 are arranged in a front portion of a vehicle body to extend along the longitudinal direction of the vehicle body, and a rotation output from the automatic transmission 3 is transmitted to right and left axles 7b and 7a via a drive axle 4 and a differential apparatus 5 arranged between the axles 7b and 7a of a pair of right and left rear wheels (driving wheels) 6b and 6a.

A pair of right and left axle members 11b and 11a are respectively coupled to axles 9b and 9a of a pair of right and left front wheels (driven wheels) 8b and 8a via universal joints 10b and 10a, which can transmit rotation. A multi-disc viscous clutch 12 (corresponding to the differential limiting means) of the differential limiting apparatus is arranged between the right and left axle members 11b and 11a. The left axle member 11a is integrally coupled to a shaft member of the multi-disc viscous clutch 12, and the right axle member 11b is integrally coupled to a case of the multi-disc viscous clutch 12.

Note that FIG. 1 also illustrates a steering mechanism 14 coupled to a steering wheel 13.

The above-mentioned differential limiting apparatus is used for limiting a differential (rotational speed difference) between the right and left front wheels 8b and 8a, and comprises the multi-disc viscous clutch 12, a control unit 20 for controlling the clutch 12, and various sensors 22 to 26. The multi-disc viscous clutch 12 is constituted by a plurality of inner clutch discs fixed to its shaft member, a plurality of outer clutch discs arranged between two adjacent ones of these inner clutch discs, and fixed to a case, an electromagnetic viscous fluid, filled in the case, for applying a viscous force between the inner and outer clutch discs, a solenoid 21 arranged on one end portion in the case, and the like. When a magnetic field to be applied to the electromagnetic viscous fluid is strengthened by the solenoid 21, the viscosity of the electromagnetic viscous fluid increases, and the viscous force acting between the inner and outer clutch discs increases. More specifically, a differential limiting force for limiting the differential between the right and left front wheels 8b and 8a increases.

The sensors include a steering angle sensor 22 for detecting a steering angle θh of the steering wheel 13, a vehicle speed sensor 23 for detecting a vehicle speed V of the vehicle 1, a hydraulic pressure sensor 24 for detecting a brake hydraulic pressure P of a brake device, a vertical acceleration sensor 25 for detecting a vertical acceleration G of the vehicle body so as to determine a rough road, a μ sensor 26 for detecting a frictional coefficient μ of the road surface, and the like. The detection signals from these sensors are supplied to the control unit 20.

The control unit 20 comprises an A/D converter for converting the detection signals from the sensors into digital signals, a waveform shaping circuit, an input/output interface, a microcomputer, a drive circuit for supplying a controlled drive current to the solenoid 21, and the like. The microcomputer pre-stores a differential limiting control program (to be described later).

The object of arranging this differential limiting apparatus is to correct traveling characteristics to the understeering side, to improve straight traveling stability in a high-speed traveling state and steering stability in an acceleration state, and to improve safety by suppressing slipping when a vehicle travels or is braked on a low-μ road.

Figure 2:
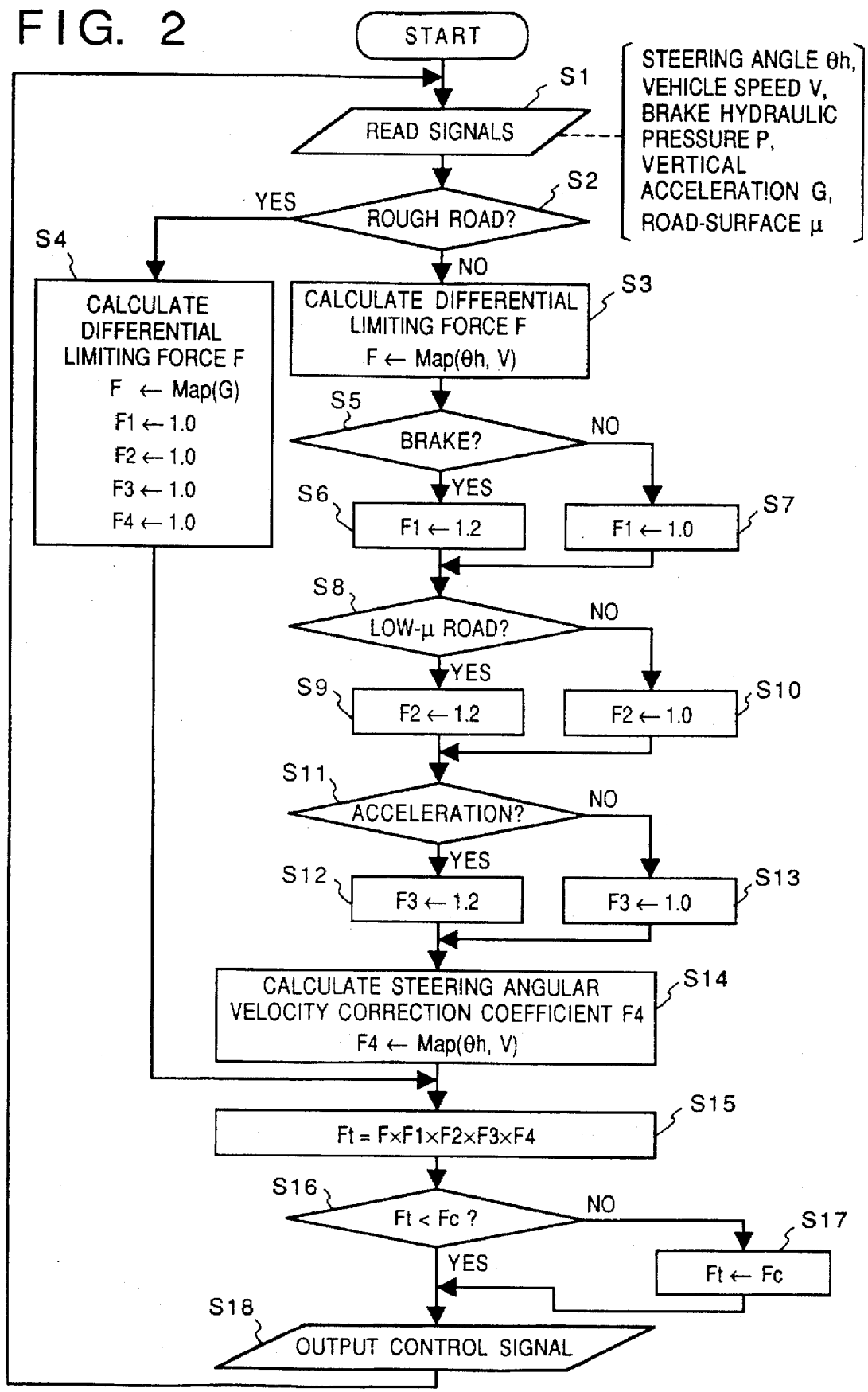
FIG. 2 is a flow chart showing a differential limiting control sequence executed by the differential limiting apparatus of the first embodiment.

A differential limiting control sequence for controlling the differential limiting force of the multi-disc viscous clutch 12 of the differential limiting apparatus in correspondence with the traveling state of the vehicle 1 will be described below with reference to the flow chart in FIG. 2. Note that the sequence shown in FIG. 2 is executed by the control unit 20, and Si (i=1, 2, . . . ) in FIG. 2 indicates each step.

When control is started simultaneously with the start of the engine 2, signals of various physical quantities (the steering angle θh, the vehicle speed V, the brake hydraulic pressure P, the vertical acceleration G, and the road-surface μ) associated with the traveling state of the vehicle 1 are fetched from the sensors in step S1.

In step S2, whether or not the vertical acceleration G is equal to or larger than a predetermined value is checked to determine if the vehicle is traveling along a rough road. If NO in step S2, i.e., if it is determined that the vehicle is not traveling along a rough road, a differential limiting force F for limiting the differential between the right and left front wheels 8b and 8a is calculated from a map (Map(θh, V)) shown in FIG. 3 in step S3.

Figure 3:
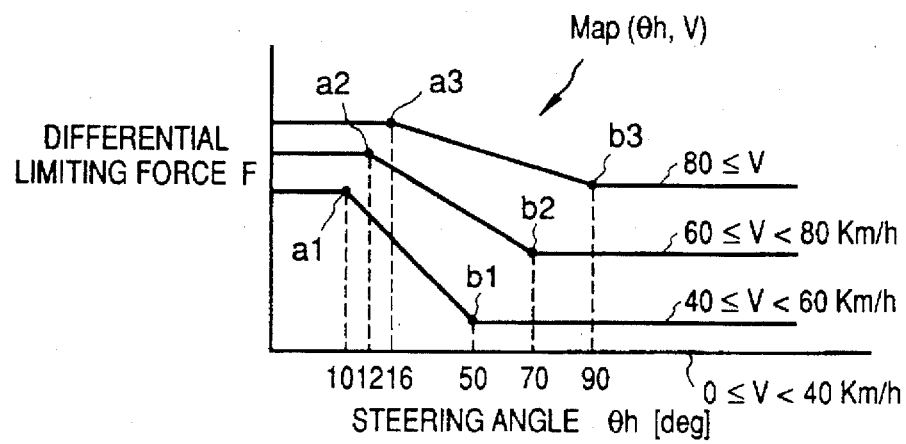
FIG. 3 is a map used for calculating a differential limiting force in the differential limiting apparatus of the first embodiment.

In the map shown in FIG. 3, the differential limiting force F is set using the steering angle θh and the vehicle speed V as parameters. The map shown in FIG. 3 is set to decrease the differential limiting force F as the steering angle θh increases, and to increase the differential limiting force F as the vehicle speed V increases, so as to improve straight traveling stability in a high-speed traveling state while assuring turning performance in a low-speed traveling state. In order to prevent the differential limiting force F from varying in a high-speed traveling state at a small steering angle as much as possible, when the steering angle is equal to or smaller than a predetermined steering angle, the change rate of the differential limiting force F is set to be zero, and the predetermined steering angle is set to increase as the vehicle speed V increases, as indicated by points a1, a2, and a3. Thus, the straight traveling stability according to the vehicle speed V can be improved, and the understeering tendency can be strengthened, thereby improving steering stability. Also, in order to prevent the differential limiting force F from varying in a turning state at a large steering angle as much as possible, when the steering angle is equal to or larger than another predetermined steering angle, the change rate of the differential limiting force F is also set to be zero, and this predetermined steering angle set to increase as the vehicle speed V increases, as indicated by points b1, b2, and b3. Thus, a variation in turning performance when the vehicle makes a turn at a relatively low speed is prevented.

On the other hand, if it is determined in step S2 that the vertical acceleration G is equal to or larger than the predetermined value, i.e., if it is determined that the vehicle is traveling along a rough road, the flow advances to step S4. In step S4, the differential limiting force F is calculated from a map (Map(G)) shown in FIG. 4, and at the same time, all correction coefficients F1, F2, F3, and F4 are set to be 1.0. After the differential limiting force F is calculated in step S4, the flow advances to step S15.

Figure 4:
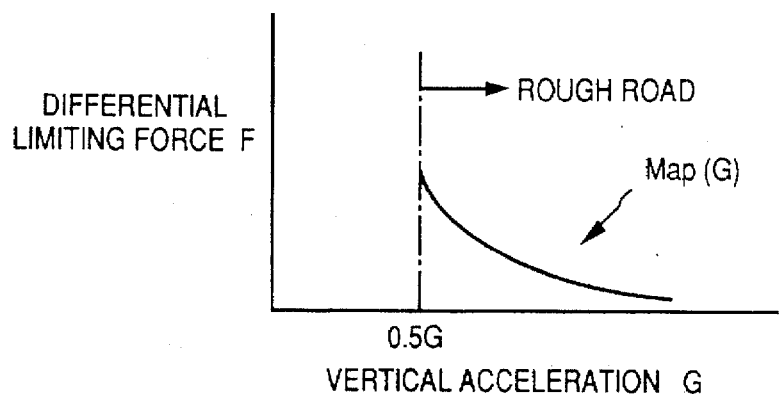
FIG. 4 is a map used for calculating a differential limiting force in a rough-road traveling state in the differential limiting apparatus of the first embodiment.

The map shown in FIG. 4 sets the differential limiting force F in a rough-road region in which the vertical acceleration G is equal to or larger than the predetermined value. The map shown in FIG. 4 is set to decrease the differential limiting force F as the vertical acceleration G increases. Thus, rough-road traveling performance can be assured. Note that the map shown in FIG. 4 may be set as a map using the vertical acceleration G and the vehicle speed V as parameters.

If it is determined that the vehicle is not traveling along a rough road, after the differential limiting force F is calculated in step S3, it is checked based on the brake hydraulic pressure P in step S5 if the vehicle is being braked. If YES in step S5, a brake correction coefficient F1 is set to be F1=1.2 in step S6; otherwise, F1=1.0 is set in step S7.

Subsequently, it is checked based on the road-surface μ in step S8 if the vehicle is traveling along a low-μ road such as a snow-covered road or a wet road. If YES in step S8, a road-surface μ correction coefficient F2 is set to be F2=1.2 in step S9; otherwise, F2=1.0 is set in step S10.

Subsequently, it is checked based on a change rate dV/dt of the vehicle speed V in step S11 if the vehicle is accelerating. If YES in step S11, an acceleration correction coefficient F3 is set to be F3=1.2 in step S12; otherwise, F3=1.0 is set in step S13.

Subsequently, a steering angular velocity correction coefficient F4 is calculated from a map (MaP(θh, V)) shown in FIG. 5.

Figure 5:
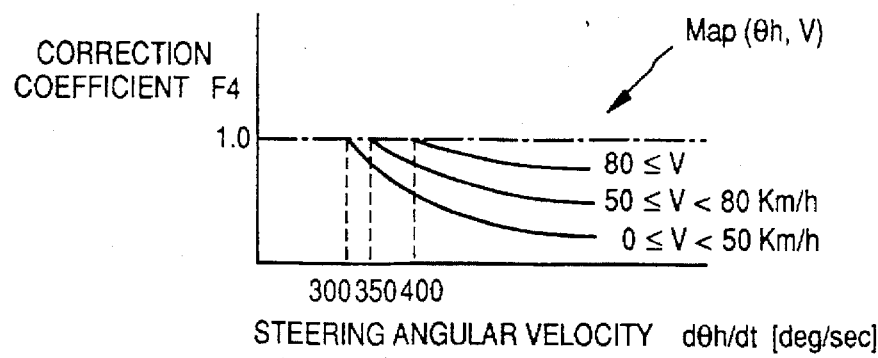
FIG. 5 is a map showing a steering angular velocity correction coefficient of the first embodiment.

The map shown in FIG. 5 sets the steering angular velocity correction coefficient F4 to be a value equal to or smaller than 1.0 using the steering angular velocity dθh/dt and the vehicle speed V as parameters. The map shown in FIG. 5 is set to decrease the steering angular velocity correction coefficient F4 as the steering angular velocity dθh/dt increases, and to increase the steering angular velocity correction coefficient F4 as the vehicle speed V increases. Thus, the differential limiting force F can be decreased in correspondence with the steering angular velocity dθh/dt in a turning state, and the differential limiting force F can be increased in correspondence with the vehicle speed V.

After the differential limiting force F is calculated in step S4, or after the steering angular velocity correction coefficient F4 is calculated in step S14, a target differential limiting force Ft is calculated using the following equation in step S15.

$$Ft = F \times F1 \times F2 \times F3 \times F4$$

Subsequently, it is checked in step S16 if the target differential limiting force Ft is smaller than a predetermined value Fc. If Ft<Fc, the flow advances to step S18; if Ft≧Fc, the target differential limiting force Ft is set to be the predetermined value Fc in step S17, and the flow then advances to step S18.

The predetermined value Fc is defined to clip the target differential limiting force Ft so as to allow a slight differential even when maximum differential limiting is to be achieved. More specifically, if no differential is allowed at all, traveling stability is impaired when traveling on a slightly toughened surface in a high-speed traveling state. For this reason, the target differential limiting force Ft is limited to the predetermined value Fc, thereby allowing a slight differential.

Subsequently, in step S18, a control signal based on the target differential limiting force Ft set in steps S15 to S17 is output to the drive circuit of the solenoid 21. The drive circuit outputs a drive current according to the input target differential limiting force Ft to the solenoid 21, and the differential limiting force of the multi-disc viscous clutch 12 is controlled to the target differential limiting force Ft.

After step S18, the flow returns to step S1, and steps S1 to S18 are repetitively executed. As a result, the differential limiting force of the multi-disc viscous clutch 12 is controlled to the target differential limiting force Ft all the time, and differential limiting control for limiting the differential between the right and left front wheels 8b and 8a can be realized.

Note that the values "1.2" in steps S6, S9, and S12 in FIG. 2 are merely examples, and the present invention is not limited to these values.

The effects of the above-mentioned differential limiting apparatus will be described below.

Since the multi-disc viscous clutch 12 adopts an arrangement for transmitting the differential limiting force via the electromagnetic viscous fluid, the clutch discs never wear. Therefore, the clutch 12 is free from a change in characteristics caused by wear of the clutch discs, and has high reliability and durability.

Furthermore, since the differential limiting is relaxed in correspondence with an increase in steering angle θh, as set in the map in FIG. 3, when the vehicle travels along a winding ridge road, or makes a turn at, e.g., an intersection, turning performance can be assured. At the same time, when a vehicle travels at a low vehicle speed less than 40 km/h, the differential limiting is not performed, and is strengthened as the vehicle speed V increases. For this reason, the straight traveling stability at a high vehicle speed can be improved while assuring turning performance at a low vehicle speed, and traveling stability can be improved by strengthening an understeering tendency.

Furthermore, in a straight traveling state (the steering angle θh=0), maximum differential limiting is performed and the target differential limiting force Ft is clipped in steps S16 and S17 in FIG. 2 so as to allow a slight differential in maximum differential limiting in a high-speed traveling state. For this reason, traveling stability can be prevented from being impaired by a roughened road surface while extremely improving straight traveling stability in a straight traveling state.

The predetermined steering angle (a1, a2, and a3 in FIG. 3) below which the change rate of the differential limiting force F is set to be zero is shifted toward a larger steering angle θh as the vehicle speed V increases. Thus, the non-change range of the differential limiting force F can be widened in a high-speed traveling state at a small steering angle, thus assuring stability in the high-speed traveling state. On the other hand, the predetermined steering angle (b1, b2, and b3 in FIG. 3) above which the change rate of the differential limiting force F is set to be zero is shifted toward a smaller steering angle θh as the vehicle speed V decreases. Thus, the non-change range of the differential limiting force F can be widened in a low-speed, large-steering angle state, thus assuring turning stability.

Furthermore, in a rough-road traveling state, the differential limiting is relaxed to improve rough-road traveling performance. Conversely, on a low-µ road, the differential limiting is strengthened to prevent slipping on the low-µ road. Also, in an accelerated state, the differential limiting is strengthened to relax an oversteering tendency in the rear-wheel drive vehicle which has a strong oversteering tendency.

MODIFICATIONS

Modifications of the above-mentioned first embodiment will now be described.

FIRST MODIFICATION

In the above embodiment, the differential between the right and left front wheels 8b and 8a is limited in correspondence with the traveling state of the vehicle 1, but may be limited in correspondence with the traveling state and the turning degree of the vehicle 1. A modification for limiting the differential in correspondence with the traveling state and the turning degree will be described below.

Figure 11:
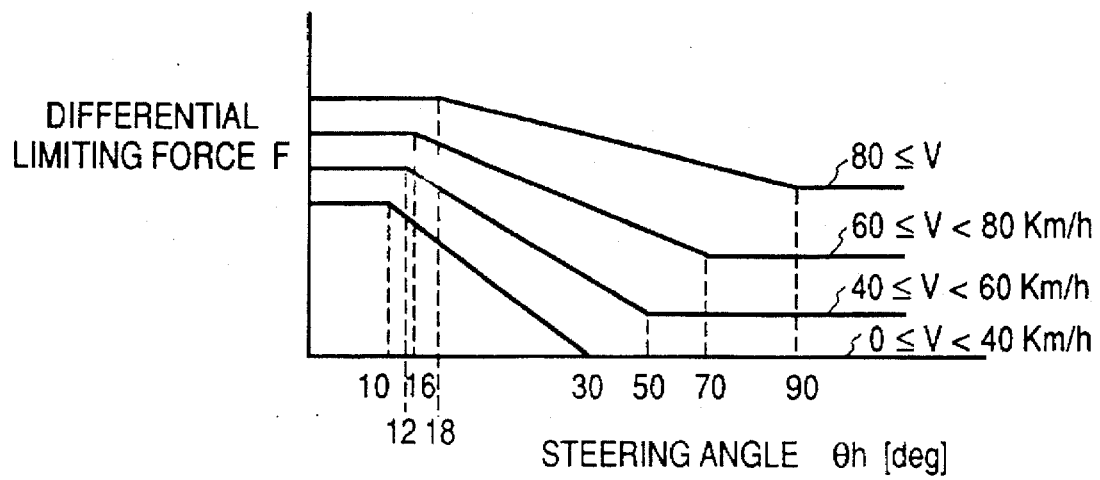
FIG. 11 is a map used for calculating a differential limiting force in the differential limiting apparatus in the first modification of the first embodiment.

A map shown in FIG. 11 adopts the steering angle θh as a parameter representing the turning degree, and sets the differential limiting force F using the steering angle θh and the vehicle speed V as parameters. The map in FIG. 11 is set to decrease the differential limiting force F as the turning degree (steering angle θh) increases, and to increase the differential limiting force F as the vehicle speed V increases, so as to assure turning performance of the vehicle 1, and to improve straight traveling stability in a high-speed traveling state. In this case, a map, which sets the differential limiting force using, as parameters, the vehicle speed V, and a lateral acceleration (corresponding to the turning degree) of the vehicle 1 detected by a lateral acceleration sensor or a yaw rate (corresponding to the turning degree) of the vehicle 1 detected by a yaw rate sensor, may be used.

Figure 12:
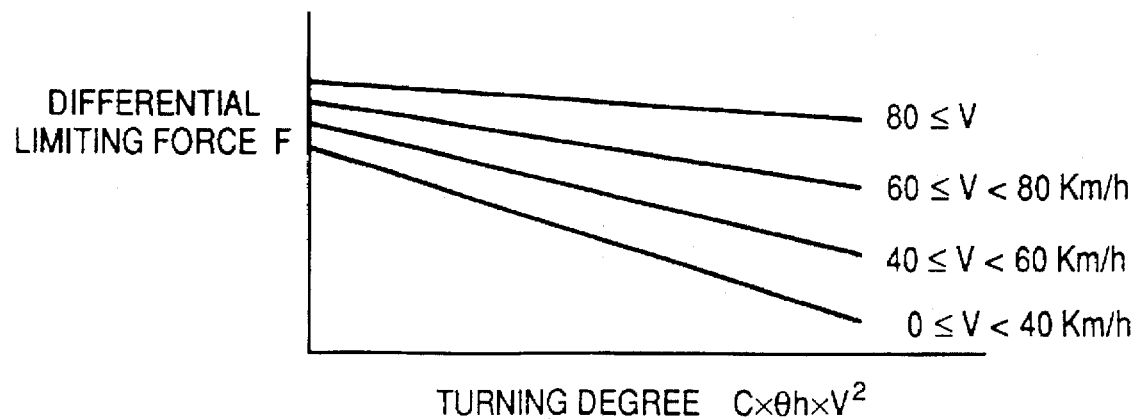
FIG. 12 is another map used for calculating a differential limiting force in the differential limiting apparatus in the first modification.

Furthermore, a map shown in FIG. 12 may be used in place of the map shown in FIG. 11. The map shown in FIG. 12 sets the differential limiting force F using, as parameters, the vehicle speed V and the turning degree (C×θh×V² where C is a predetermined constant) corresponding to the lateral acceleration. The map in FIG. 12 is set to decrease the differential limiting force F as the turning degree increases, and to increase the differential limiting force F as the vehicle speed V increases.

Thus, since the differential limiting is relaxed in correspondence with an increase in turning degree, when the vehicle travels along a winding ridge road, or makes a turn at, e.g., an intersection, turning performance can be assured. At the same time, since the differential limiting is strengthened in correspondence with an increase in vehicle speed V, the understeering tendency in a high-speed traveling state can be strengthened while assuring turning performance in a low-speed traveling state, thereby improving straight traveling stability.

SECOND MODIFICATION

In the embodiment described above, in step S8 in FIG. 2, it is checked based on the road-surface µ if the vehicle is traveling along a low-µ road such as a snow-covered road or a wet road, and the road-surface μ correction coefficient F2 is set in accordance with the checking result. Alternatively, the road-surface μ correction coefficient F2 may be calculated in accordance with the road-surface μ, and a modification for calculating the correction coefficient F2 will be described below.

Figure 13:
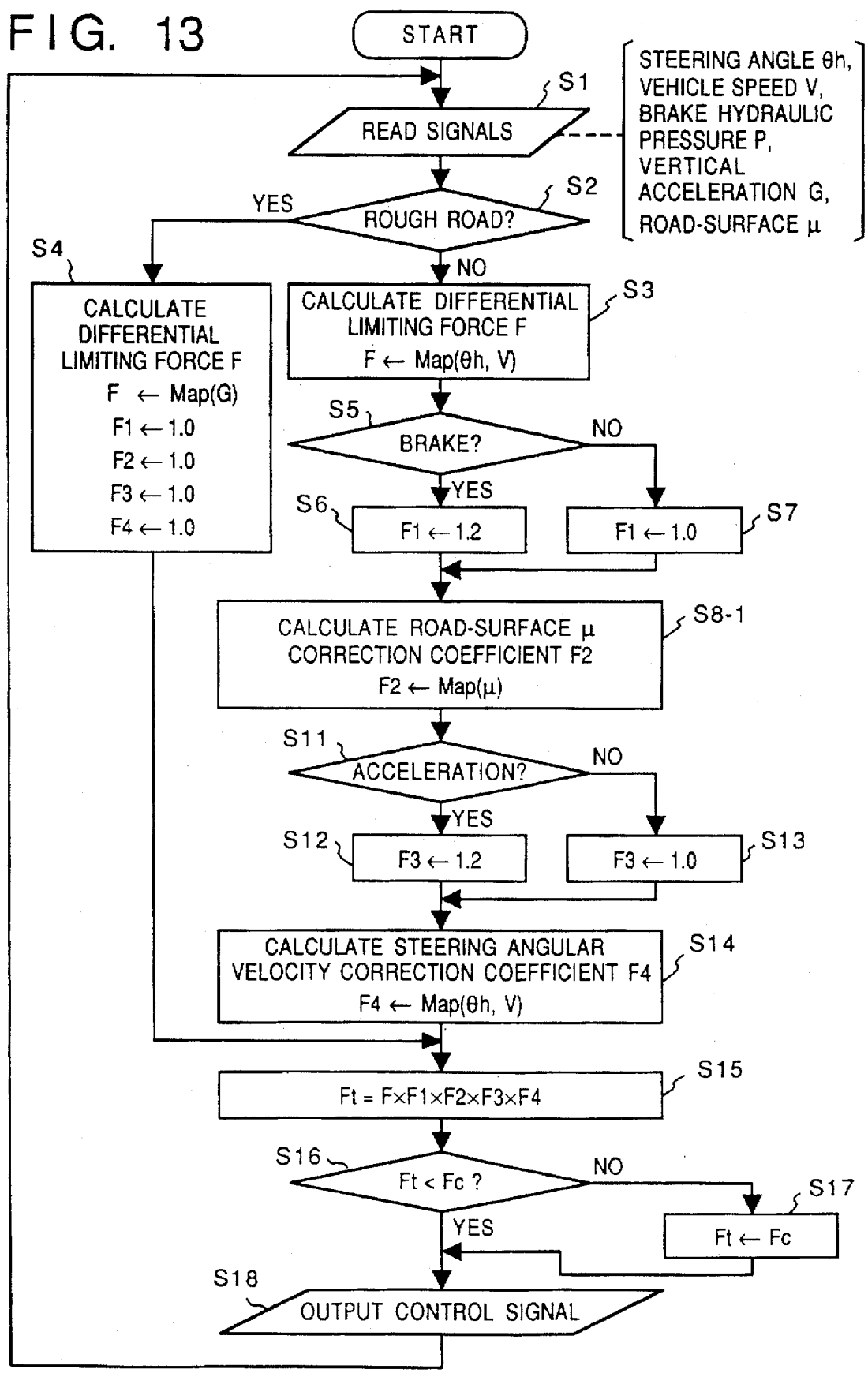
FIG. 13 is a flow chart showing a differential limiting control sequence executed by the differential limiting apparatus in the second modification of the first embodiment.

The flow chart in FIG. 13 shows a differential limiting control sequence executed when the road-surface μ correction coefficient F2 is calculated in accordance with the road-surface μ. Note that the same reference numerals denote steps of executing the same processing as in the steps shown in FIG. 2, and a detailed description thereof will be omitted.

Figure 14:
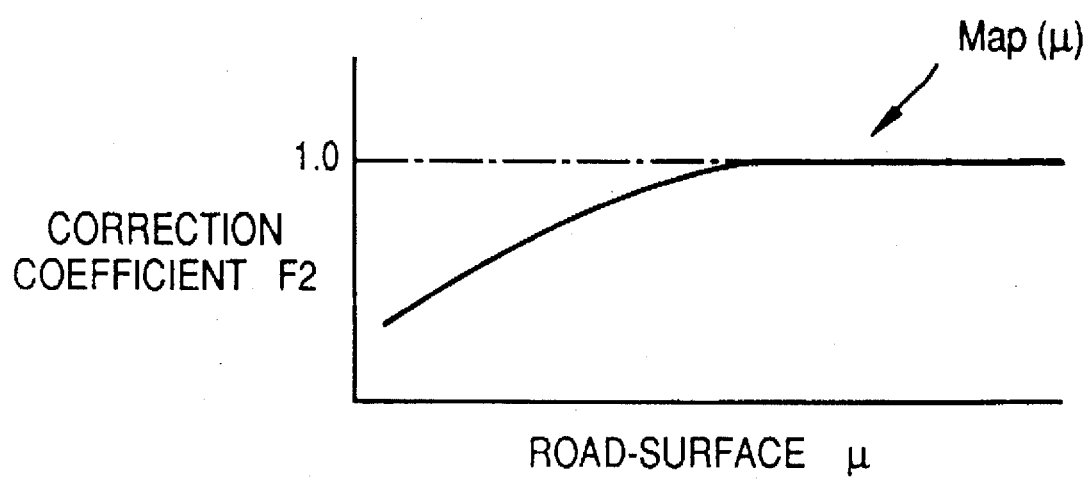
FIG. 14 is a map used for calculating a road-surface μ correction coefficient in the differential limiting apparatus in the second modification.

Referring to FIG. 13, after step S6 or S7, the road-surface μ correction coefficient F2 is calculated from a map (Map (μ)) shown in FIG. 14 in step S8-1.

The map shown in FIG. 14 sets the correction coefficient F2 to be a value equal to or smaller than 1.0 using the road-surface μ as a parameter. With this map, the differential limiting force F decreases as the road-surface μ decreases.

In this manner, when correction is made to decrease the differential limiting force F as the road-surface μ decreases, both steering stability upon traveling on a low-μ road such as a snow-covered road or a wet road, and steering stability upon traveling on a high-μ road can be attained at the same time.

Figure 15:
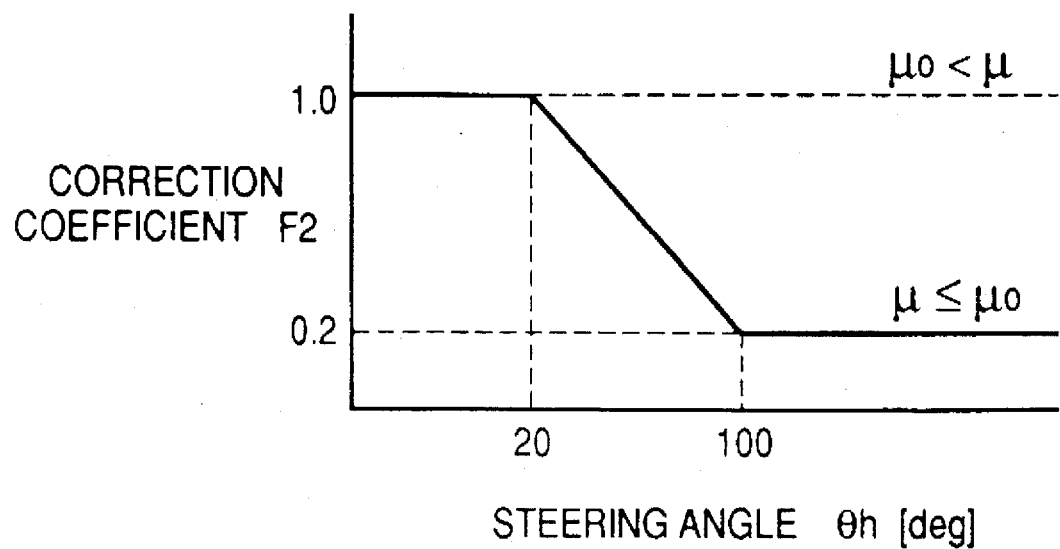
FIG. 15 is another map used for calculating a road-surface μ correction coefficient in the differential limiting apparatus in the second modification.

A map shown in FIG. 15 may be used in place of the map shown in FIG. 14. The map shown in FIG. 15 sets the correction coefficient F2 to be 1.0 for a high-μ road exceeding a predetermined value $μ_0$. The map sets the correction coefficient F2 to be 1.0 for a low-μ road below the predetermined value $μ_0$ in a region with a small steering angle θh, decreases the correction coefficient in correspondence with an increase in steering angle θh in a region with a middle steering angle θh, and sets the correction coefficient F2 to be considerably smaller than 1.0 in a region with a large steering angle θh.

When the road-surface μ correction coefficient F2 is set in this manner, straight traveling stability can be improved by achieving the understeering tendency in a high-speed traveling state at a small steering angle, and turning performance in a traveling state with a large steering angle can be assured. Note that the map shown in FIG. 15 may be replaced by a map for classifying the road-surface μ into a plurality of stages.

SECOND EMBODIMENT

The second embodiment as a partial modification of the first embodiment will be described below. In this embodiment, a differential limiting apparatus according to the present invention is applied to a front-wheel drive vehicle, and a differential between right and left rear wheels is limited.

Figure 6:
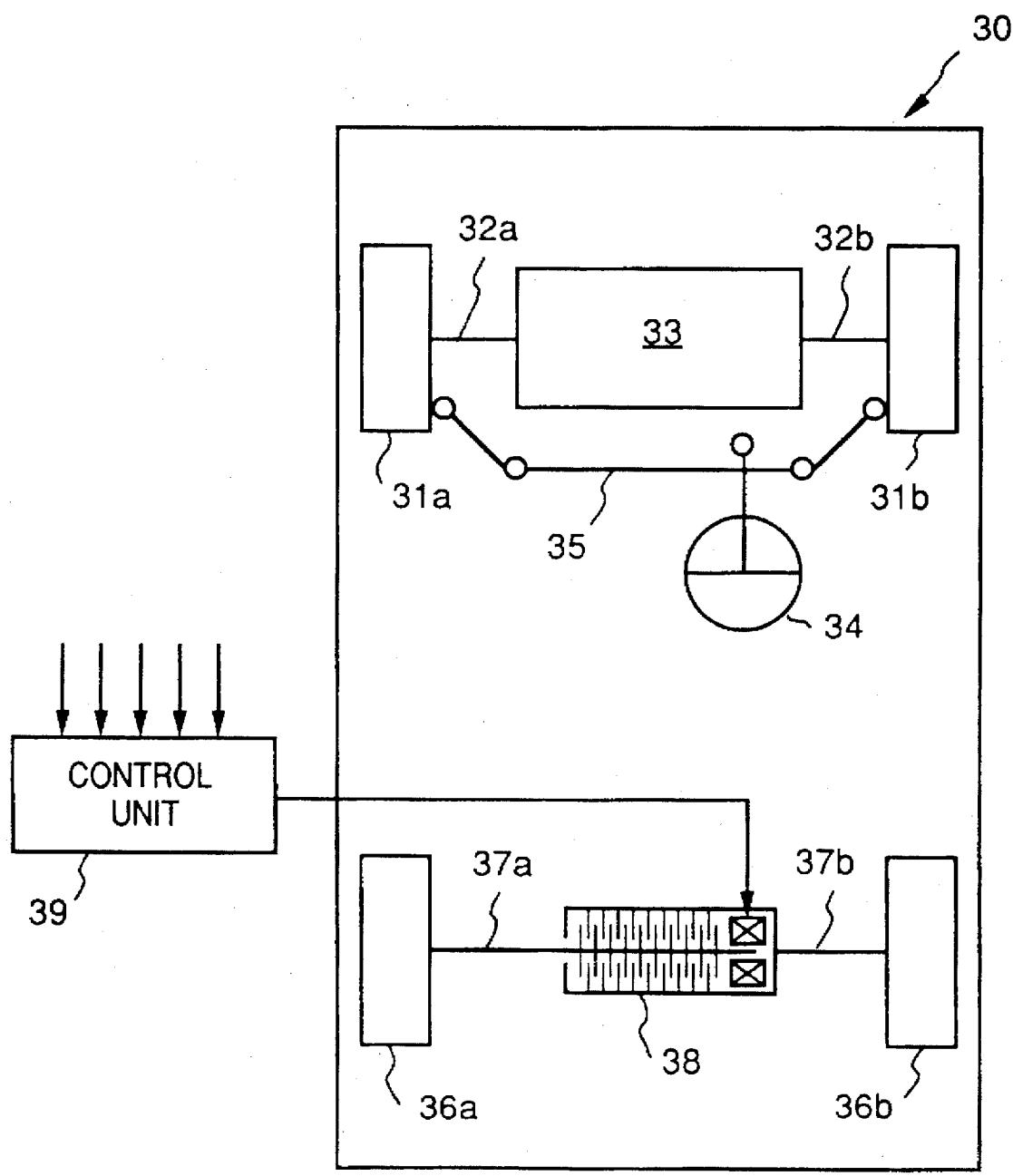
FIG. 6 is a schematic view showing an arrangement of a driven wheel differential limiting apparatus for a front-wheel drive vehicle according to the second embodiment of the present invention.

As shown in FIG. 6, in a front-wheel drive vehicle 30, a power unit 33 including an engine and an automatic transmission is laterally arranged between axles 32b and 32a of a pair of right and left front wheels (driving wheels) 31b and 31a. FIG. 6 also illustrates a steering wheel 34 and a steering mechanism 35 coupled thereto.

A multi-disc viscous clutch 38 is laterally arranged between axles 37b and 37a of a pair of right and left rear wheels (driven wheels) 36b and 36a. The axle 37a of the left rear wheel 36a is integrally coupled to a shaft member of the multi-disc viscous clutch 38, and the axle 37b of the right rear wheel 36b is integrally coupled to a case of the multi-disc viscous clutch 38. The multi-disc viscous clutch 38 limits a differential between the right and left rear wheels 36b and 36a. Note that the multi-disc viscous clutch 38 is constituted by filling an electromagnetic viscous fluid between a plurality of inner clutch discs and a plurality of outer clutch discs as in the multi-disc viscous clutch 12 described in the first embodiment.

The differential limiting apparatus for limiting the differential between the right and left rear wheels 36b and 36a in correspondence with the traveling state of the vehicle 30 is constituted by the multi-disc viscous clutch 38, a control unit 39, and the same sensors as those in the first embodiment. Since the control unit 39 controls a solenoid in the multi-disc viscous clutch 38 to realize differential limiting control in the same manner as in the first embodiment, a detailed description thereof will be omitted. In this case, since the traveling characteristics of the front-wheel drive vehicle have an understeering tendency, the acceleration correction coefficient F3 is set to be, e.g., F3=0.8 in step S12 in FIG. 2 so as to relax the understeering tendency in an acceleration state. Since this embodiment is applied to the front-wheel drive vehicle, steps S16 and S17 in FIG. 2 may be omitted to perform maximum differential limiting of a zero differential in a straight traveling state.

The effects of the above-mentioned differential limiting apparatus are basically the same as those in the first embodiment.

THIRD EMBODIMENT

The third embodiment as a partial modification of the second embodiment will be described below. In this embodiment, a differential limiting apparatus according to the present invention is applied to a front-wheel drive vehicle, and a differential between right and left rear wheels is limited via a fluid pressure or a fluid force.

Figure 7:
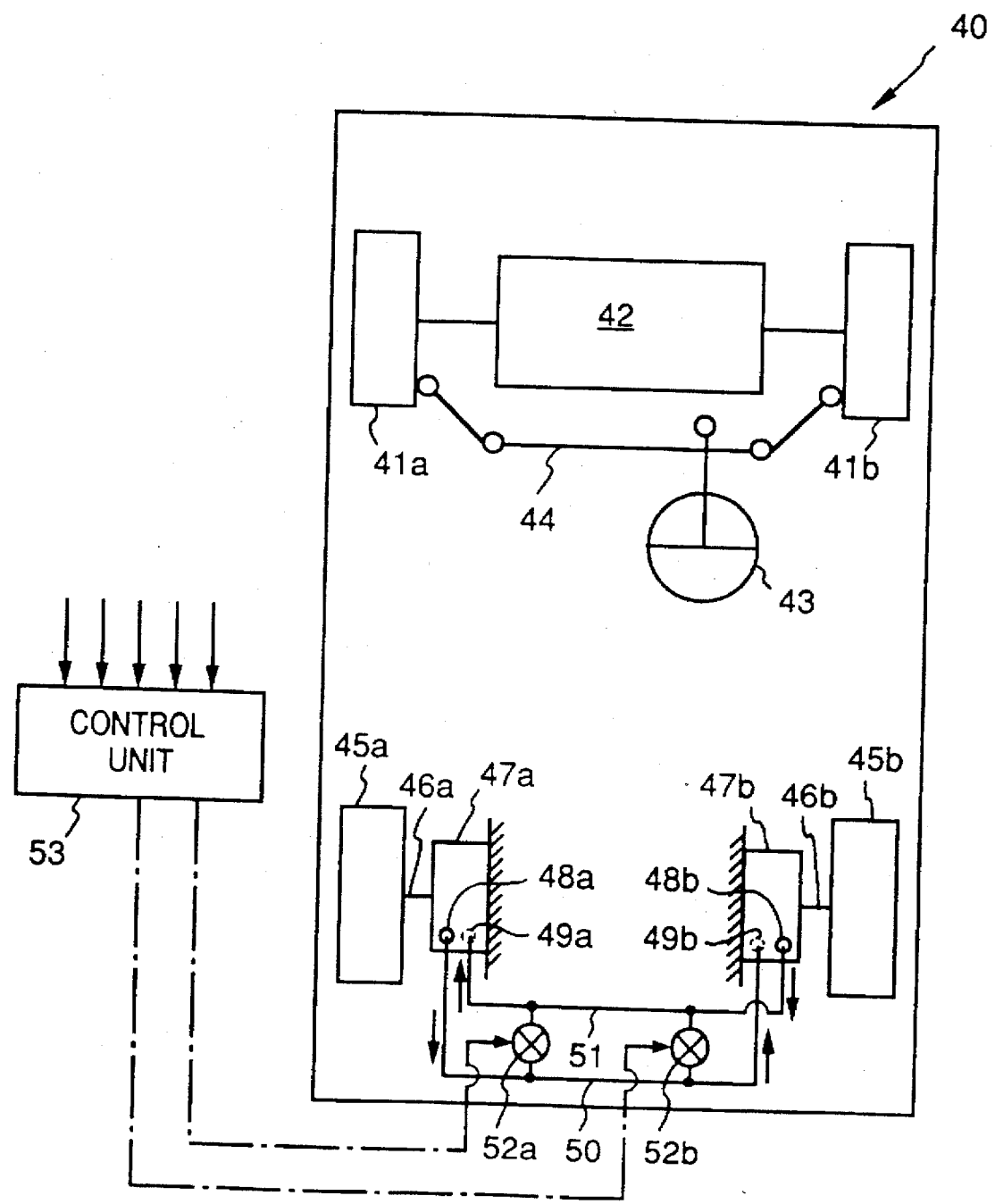
FIG. 7 is a schematic view showing an arrangement of a driven wheel differential limiting apparatus for a front-wheel drive vehicle according to the third embodiment of the present invention.

As shown in FIG. 7, a front-wheel drive vehicle 40 comprises a pair of right and left front wheels 41b and 41a, a power unit 42, a steering wheel 43, a steering mechanism 44, and the like, as in the second embodiment described above.

Furthermore, shaft members of a pair of right and left hydraulic pressure pumps/motors 47b and 47a fixed to the vehicle body are respectively coupled to axles 46b and 46a of a pair of right and left rear wheels 45b and 45a. An ejection port 48a of the left hydraulic pressure pump/motor 47a is connected to a suction port 49b of the right hydraulic pressure pump/motor 47b via an oil path 50, and an ejection port 48b of the right hydraulic pressure pump/motor 47b is connected to a suction port 49a of the left hydraulic pressure pump/motor 47a via an oil path 51. A control valve 52a is arranged midway along a coupling oil path, arranged near the left hydraulic pressure pump/motor 47a, for coupling the oil paths 50 and 51, and a control valve 52b is arranged midway along a coupling oil path, arranged near the right hydraulic pressure pump/motor 47b, for coupling the oil paths 50 and 51. The control valves 52a and 52b can electrically control their flow rates. The pair of right and left hydraulic pressure pumps/motors 47b and 47a, the oil paths 50 and 51, and the control valves 52a and 52b serve as differential limiting means for limiting the differential between the right and left rear wheels 45b and 45a via a fluid pressure or fluid force.

The differential limiting apparatus of this embodiment is constituted by the above-mentioned differential limiting means, a control unit 53, and the same sensors as those in the first embodiment. The control unit 53 controls the right and left control valves 52b and 52a in correspondence with the traveling state detected by the sensors, thereby executing differential limiting control.

The operation and effects of the differential limiting apparatus will be described below.

When the two control valves 52a and 52b are held in a full-closed state, all the amount of oil ejected from the hydraulic pressure pump/motor 47a is drawn by suction in the hydraulic pressure pump/motor 47b, and similarly, all the amount of oil ejected from the hydraulic pressure pump/motor 47b is drawn by suction in the hydraulic pressure pump/motor 47a. For this reason, when there is no differential between the right and left rear wheels 45b and 45a, the two hydraulic pressure pumps 47a and 47b are rotated without any resistance. However, when a differential is generated between the right and left rear wheels 45b and 45a, a fluid resistance acts in a direction to eliminate the differential, thus performing differential limiting.

When the two control valves 52a and 52b are opened, since oil flows at flow rates according to their degrees of opening, the differential limiting effect is lowered according to the degrees of opening. When the two control valves 52a and 52b are set in a full-open state, all the amount of oil ejected from the hydraulic pressure pump/motor 47a is drawn by suction in the hydraulic pressure pump/motor 47a via the control valve 52a, and all the amount of oil ejected from the hydraulic pressure pump/motor 47b is drawn by suction in the hydraulic pressure pump/motor 47b via the control valve 52b. For this reason, a differential limiting effect cannot be obtained.

Therefore, when the degrees of opening of the two control valves 52a and 52b are controlled within a range from the full-closed state to the full-open state, the differential limiting force F can change within a range from a maximum value to a minimum value. The control unit 20 of the above-mentioned first embodiment realizes differential limiting control according to the target differential limiting force Ft by controlling the drive current of the solenoid 21, while the control unit 53 of this embodiment realizes differential limiting control according to the target differential limiting force Ft by controlling the degrees of opening of the two control valves 52a and 52b. Therefore, the control sequence is the same as that in the first embodiment, and a detailed description thereof will be omitted. In this case, since this embodiment is applied to a front-wheel drive vehicle, the acceleration correction coefficient F3 is set to be, e.g., F3=0.8 in step S12 in FIG. 2 as in the second embodiment described above.

Note that the hydraulic pressure pumps/motors 47a and 47b may comprise, e.g., vane pumps/motors, and other hydraulic pressure pumps/motors. Also, the influence of the viscosity of oil may be compensated for depending on the oil temperature.

In the differential limiting apparatus of this embodiment, since the hydraulic pressure pumps/motors 47b and 47a can be arranged near the right and left rear wheels 45b and 45a, a relatively free layout is allowed as compared to a portion such as the central portion of the vehicle body suffering from a strict space restriction. Since the differential limiting is achieved by the fluid pressure or fluid force, the clutch discs can be omitted, and frictional wear of clutch discs never occurs, the apparatus of this embodiment has high reliability and durability.

FOURTH EMBODIMENT

The fourth embodiment as a partial modification of the third embodiment will be described below. In this embodiment, a differential limiting apparatus according to the present invention is applied to a front-wheel drive vehicle, and a differential between right and left rear wheels is limited via a fluid pressure or a fluid force.

Figure 8:
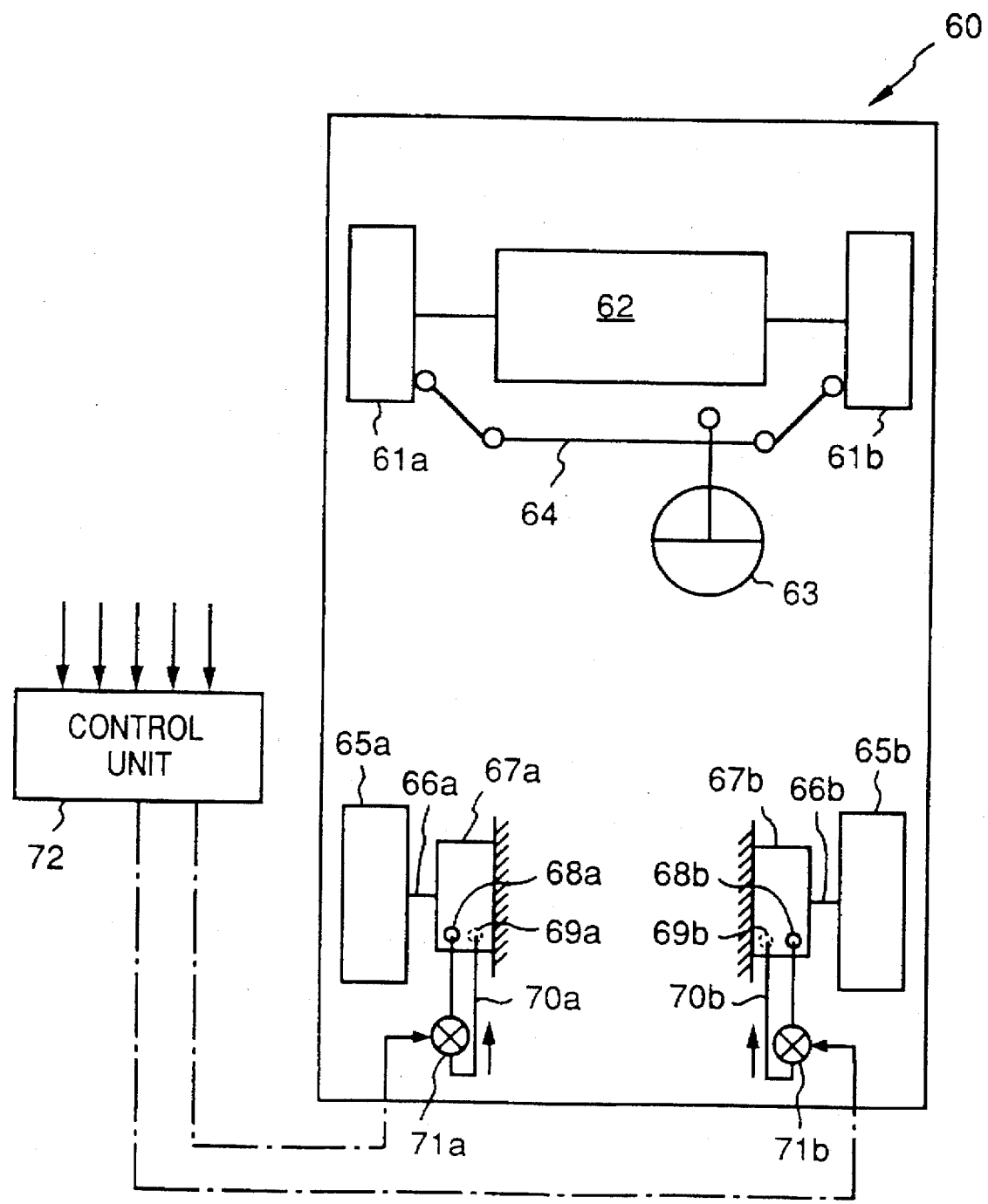
FIG. 8 is a schematic view showing an arrangement of a driven wheel differential limiting apparatus for a front-wheel drive vehicle according to the fourth embodiment of the present invention.

As shown in FIG. 8, a front-wheel drive vehicle 60 comprises a pair of right and left front wheels 61b and 61a, a power unit 62, a steering wheel 63, a steering mechanism 64, and the like, as in the second embodiment described above.

Furthermore, shaft members of a pair of right and left hydraulic pressure pumps/motors 67b and 67a fixed to the vehicle body are respectively coupled to axles 66b and 66a of a pair of right and left rear wheels 65b and 65a. A pair of right and left control valves 71b and 71a are arranged midway along an oil path 70b for connecting an ejection port 68b and a suction port 69b of the right hydraulic pump/motor 67b, and an oil path 70a for connecting an ejection port 68a and a suction port 69a of the right hydraulic pump/motor 67a. The control valves 71a and 71b can electrically control their flow rates. The pair of right and left hydraulic pressure pumps/motors 67b and 67a, the oil paths 70b and 70a, and the control valves 71b and 71a serve as differential limiting means for limiting a differential between the right and left rear wheels 65b and 65a via a fluid pressure or fluid force.

The differential limiting apparatus of this embodiment is constituted by the above-mentioned differential limiting means, a control unit 72, and the same sensors as those in the first embodiment. The control unit 72 controls the right and left control valves 71b and 71a in correspondence with the traveling state detected by the sensors, thereby executing differential limiting control.

The operation and effects of the differential limiting apparatus will be described below.

In the hydraulic pressure pumps/motors 67a and 67b, when the control valves 71a and 71b are held in a full-open state, since all the amount of ejected oil is drawn by suction in the same hydraulic pressure pumps/motors, no differential limiting effect is obtained at all. However, when the degree of opening of the control valve 71a is decreased, a fluid resistance acts on the hydraulic pressure pump/motor 67a, and when the degree of opening of the control valve 71b is decreased, a fluid resistance acts on the hydraulic pressure pump/motor 67b. Therefore, the control unit 72 controls the control valves 71a and 71b in accordance with the traveling state of the vehicle 60 detected by the sensors so as to decrease the degree of opening of the control valve 71a or 71b corresponding to the rear wheel 65a or 65b having a larger rotational speed. Thus, the rotational speed of the rear wheel 65a or 65b having a larger rotational speed can be decreased, and a differential between the right and left rear wheels 65b and 65a can be limited.

The control unit 20 of the above-mentioned first embodiment realizes differential limiting control according to the target differential limiting force Ft by controlling the drive current of the solenoid 21, while the control unit 72 of this embodiment realizes differential limiting control according to the target differential limiting force Ft by controlling the degrees of opening of the two control valves 71a and 71b. Therefore, the control sequence is the same as that in the first embodiment, and a detailed description thereof will be omitted. In this case, since this embodiment is applied to a front-wheel drive vehicle, the acceleration correction coefficient F3 is set to be, e.g., F3=0.8 in step S12 in FIG. 2 as in the second embodiment described above.

The effects of the above-mentioned differential limiting apparatus are basically the same as those of the third embodiment.

FIFTH EMBODIMENT

The fifth embodiment as a partial modification of the first embodiment will be described below. In this embodiment, a differential limiting apparatus according to the present invention is applied to a front-wheel drive vehicle, and a differential between right and left rear wheels is limited by brake devices of right and left rear wheels.

Figure 9:
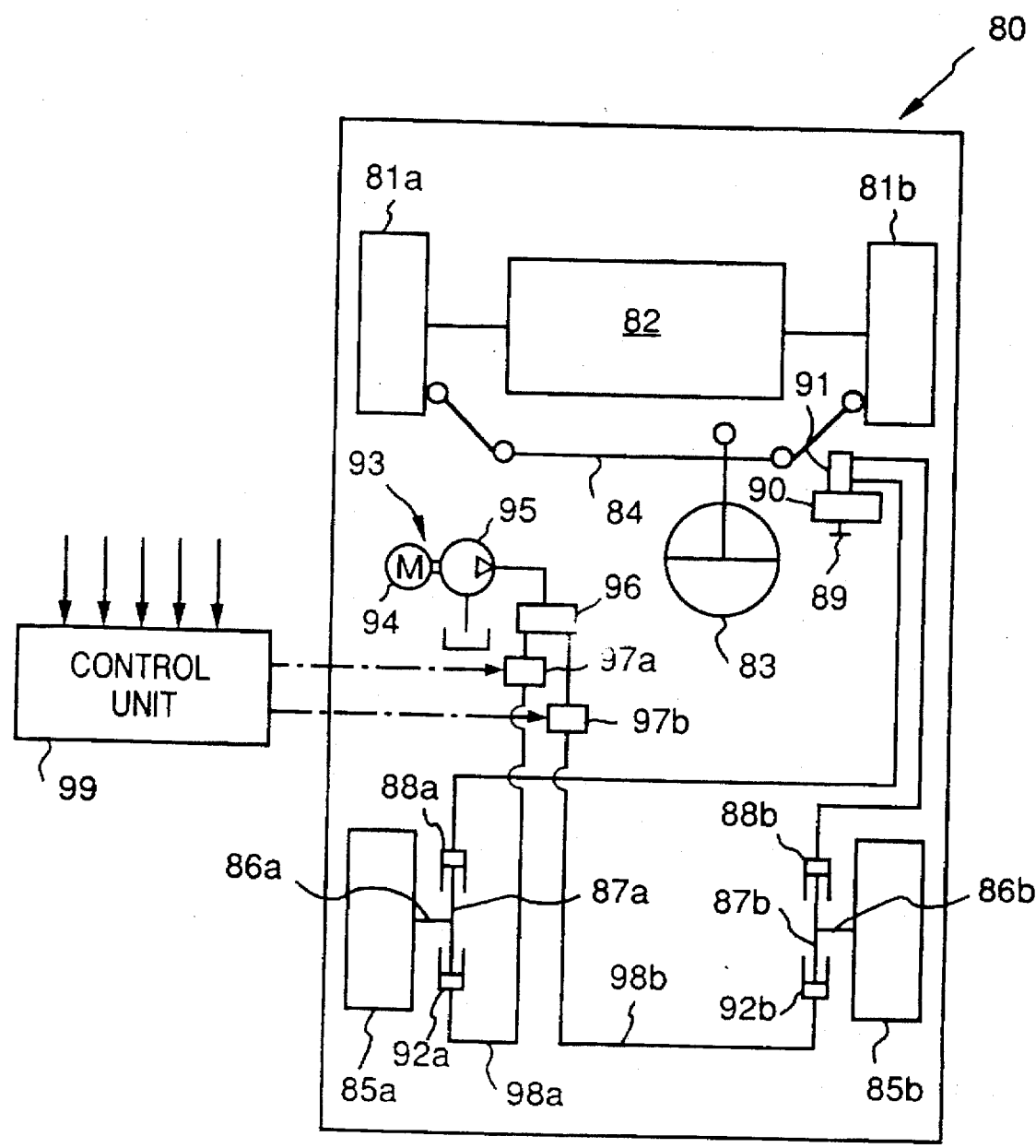
FIG. 9 is a schematic view showing an arrangement of a driven wheel differential limiting apparatus for a front-wheel drive vehicle according to the fifth embodiment of the present invention.

As shown in FIG. 9, a front-wheel drive vehicle 80 comprises a pair of right and left front wheels 81b and 81a, a power unit 82, a steering wheel 83, a steering mechanism 84, and the like, as in the second embodiment described above.

Brake devices for braking right and left rear wheels 85b and 85a will be described below. Brake discs 87b and 87a of the brake devices are fixedly coupled to axles 86b and 86a of the right and left rear wheels 85b and 85a, and calipers 88b and 88a are respectively attached to the brake discs 87b and 87a. A hydraulic pressure generated by a brake booster 90 operated by a brake pedal 89, and a master cylinder 91 is supplied to hydraulic pressure cylinders of these calipers 88b and 88a. The above-mentioned brake devices have a general arrangement in normal vehicles.

In the differential limiting apparatus of this embodiment, auxiliary calipers 92b and 92a attached to the right and left brake discs 87b and 87a, and a hydraulic pressure supply device 93 for supplying a hydraulic pressure to these auxiliary calipers 92b and 92a are arranged as differential limiting means. When the hydraulic pressure supply device 93 is arranged to supply a hydraulic pressure to the hydraulic pressure cylinders of the right and left calipers 88b and 88a to achieve differential limiting, the hydraulic pressures of the hydraulic pressure cylinders of the right and left calipers 88b and 88a cannot be held constant in a non-brake state, and brake performance of the brake devices varies. In this embodiment, a variation in brake performance is prevented by arranging the auxiliary calipers 92a and 92b.

The hydraulic pressure supply device 93 comprises a hydraulic pressure pump 95 driven by an electric motor 94, a distribution valve 96 for distributing the hydraulic pressure generated by the hydraulic pressure pump 95, an oil path 98a connected from the distribution valve 96 to a hydraulic pressure cylinder of the left auxiliary caliper 92a, an oil path 98b connected from the distribution valve 96 to a hydraulic pressure cylinder of the right auxiliary caliper 92b, and control valves 97a and 97b respectively arranged midway along the oil paths 98a and 98b. Therefore, when the hydraulic pressures to be supplied to the hydraulic pressure cylinders of the right and left auxiliary calipers 92b and 92a are controlled by opening/closing the two control valves 97b and 97a, differential limiting between the right and left rear wheels 85b and 85a can be attained.

In this manner, the differential limiting apparatus comprises the pair of right and left auxiliary calipers 92b and 92a respectively attached to the pair of right and left brake discs 87b and 87a, the hydraulic pressure supply device 93, a control unit 99 for controlling the two control valves 97a and 97b, and the same sensors as those in the first embodiment, and the control sequence of the fifth embodiment will be described below.

Therefore, the control unit 99 controls the control valves 97a and 97b in accordance with the traveling state of the vehicle 80 detected by the sensors to open the control valve 97a or 97b corresponding to the rear wheel 85a or 85b having a larger rotational speed. In this manner, the rotational speed of the rear wheel 85a or 85b having a larger rotational speed is decreased, thereby limiting a differential between the right and left rear wheels 85b and 85a.

The control unit 20 of the above-mentioned first embodiment realizes differential limiting control according to the target differential limiting force Ft by controlling the drive current of the solenoid 21, while the control unit 99 of this embodiment realizes differential limiting control according to the target differential limiting force Ft by controlling the degrees of opening of the two control valves 97a and 97b. Therefore, the control sequence is the same as that in the first embodiment. In this case, since this embodiment is applied to a front-wheel drive vehicle, the acceleration correction coefficient F3 is set to be, e.g., F3=0.8 in step S12 in FIG. 2 as in the second embodiment described above. Also, the control valves 97b and 97a may be controlled, so that a rotational speed difference between the right and left rear wheels 85b and 85a becomes equal to or smaller than a predetermined value, or the control valves may be controlled to decrease the predetermined value in correspondence with an increase in vehicle speed V.

SIXTH EMBODIMENT

An embodiment of a differential limiting apparatus adopting a multi-disc frictional clutch according to the present invention will be described below.

Figure 10:
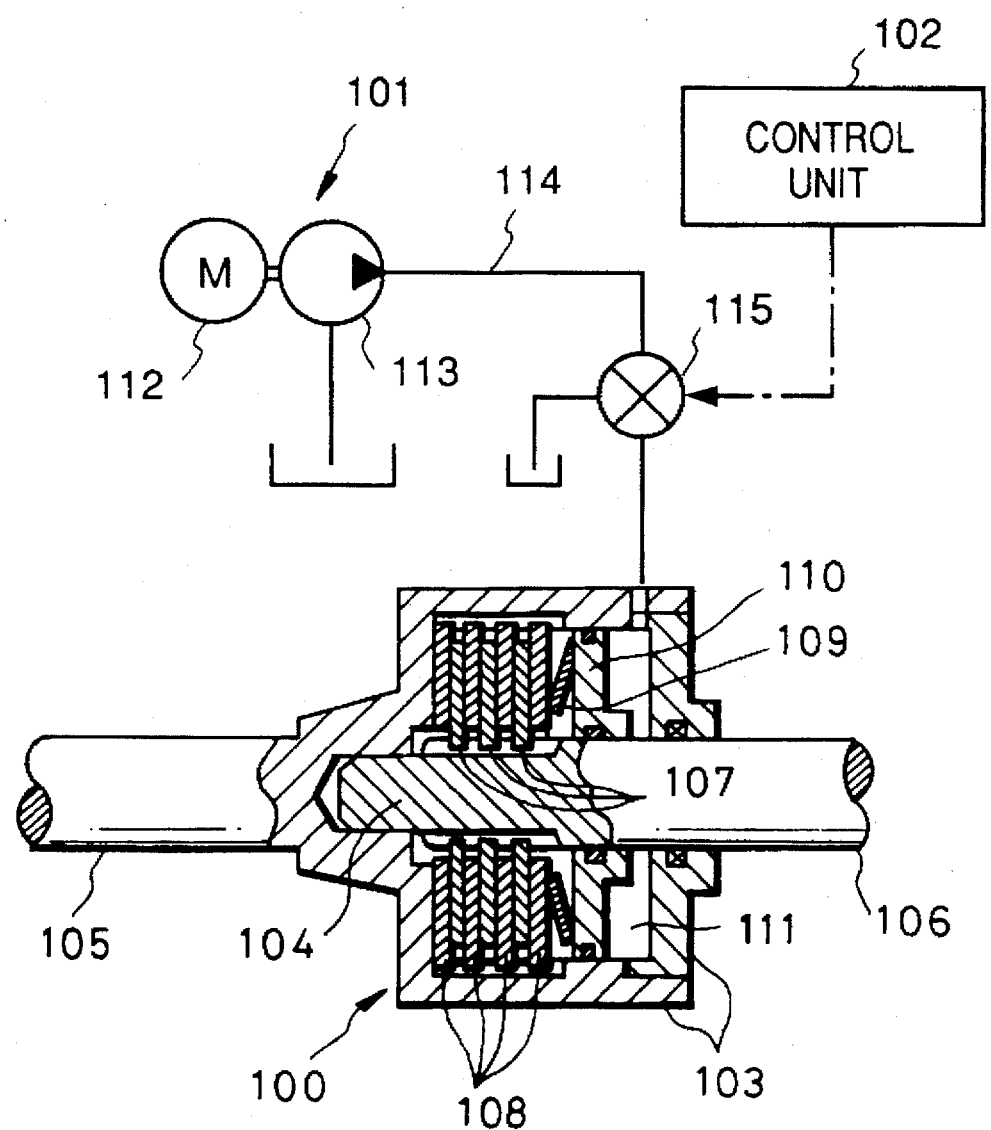
FIG. 10 is a partially cutaway view of a differential limiting apparatus according to the sixth embodiment of the present invention.

As shown in FIG. 10, a differential limiting apparatus for limiting a differential between right and left driven wheels of a vehicle comprises a hydraulic pressure-biased multi-disc frictional clutch 100, a hydraulic pressure supply device 101, and a control unit 102.

The hydraulic pressure-biased multi-disc frictional clutch 100 will now be described.

A case 103 of the multi-disc frictional clutch 100 is integrally coupled to an axle 105 of the left driven wheel. Note that when the driven wheels are front wheels, the case 103 is integrally coupled to an axle member coupled to an axle via a universal joint. A shaft member 104 of the clutch 100 is integrally coupled to an axle 106 (or an axle member coupled to the axle) of the right driven wheel.

In the case 103, a plurality of inner clutch discs 107 spline-fitted on the shaft member 104, a plurality of outer clutch discs 108 arranged between these inner clutch discs 107, and spline fitted on the inner circumferential surface of the case 103, a belleville spring 109, and a piston member 110 are arranged, as shown in FIG. 10. An oil chamber 111 on the right side of the piston 110 in the case 103 is supplied with a hydraulic pressure from the hydraulic pressure supply device 101. When this hydraulic pressure is controlled, a differential between the axles 105 and 106 is limited. Note that the belleville spring 109 may be omitted.

The hydraulic pressure supply device 101 comprises a hydraulic pressure pump 113 driven by an electric motor 112, an oil path 114 for connecting an ejection port of the hydraulic pressure pump 113 to the oil chamber 111, and a control valve 115 arranged midway along the oil path 114. The degree of opening of the control valve 115 is controlled by the control unit 102. When the hydraulic pressure in the oil chamber 111 is sufficiently low, since no frictional force acts between the inner and outer clutch discs 107 and 108, no differential limiting effect is obtained. When the hydraulic pressure in the oil chamber 111 is increased, since the frictional force acts between the inner and outer clutch discs 107 and 108 in correspondence with the increased hydraulic pressure, a differential limiting effect can be obtained.

Since differential limiting control executed by the control unit 102 is basically the same as in the above-mentioned embodiments, a detailed description thereof will be omitted. The differential limiting apparatus of this embodiment can be applied to both differential limiting between the right and left rear wheels of a front-wheel drive vehicle, and differential limiting between the right and left front wheels of a rear-wheel drive vehicle. Furthermore, an electromagnetic clutch having a mechanism for transmitting a fastening force by a frictional contact between frictional discs may be arranged in place of the multi-disc frictional clutch 100, and the fastening force may be changed in correspondence with the magnitude of a drive current to be supplied to the electromagnetic clutch. Thus, the differential limiting force F may be controlled by controlling the drive current.

As many apparently widely different embodiments of the present invention can be made without departing from the spirit and scope thereof, it is to be understood that the invention is not limited to the specific embodiments thereof except as defined in the appended claims.

What is claimed is:

1. A driven wheel differential speed controlling apparatus for a vehicle having a pair of right and left driving wheels and a pair of right and left driven wheels, comprising:

limiting means for limiting a differential speed between said driven wheels;

detection means for detecting various physical quantities associated with a traveling state of said vehicle; and control means for controlling said limiting means on the basis of an output from said detection means so as to achieve a differential speed control between said driven wheels in correspondence with the traveling state of said vehicle.

2. The apparatus according to claim 1, wherein said control means controls to relax a limitation of said differential speed in correspondence with an increase in steering angle detected by said detection means.

3. The apparatus according to claim 1, wherein when the output from said detection means indicates a straight traveling state, said control means maximizes a limitation of said differential speed allowing a slight differential speed between said driven wheels.

4. The apparatus according to claim 1, wherein in a case where said driven wheels are rear wheels of said vehicle, and where the output from said detection means indicates a straight traveling state, said control means maximizes a limitation of said differential speed allowing a zero differential speed between said driven wheels.

5. The apparatus according to claim 1, wherein when the output from said detection means indicates a low-speed traveling state, said control means prohibits said limiting means from limiting said differential speed.

6. The apparatus according to claim 1, wherein said control means controls to strengthen a limitation of said differential speed in correspondence with an increase in vehicle speed detected by said detection means.

7. The apparatus according to claim 1, wherein said control means performs said differential speed control for relaxing a limitation of said differential speed in correspondence with an increase in steering angle, and for strengthening said limitation in correspondence with an increase in vehicle speed using the steering angle and the vehicle speed detected by said detection means as parameters, sets a change rate of said limitation to be substantially zero when the steering angle is not less than a predetermined value, and increases the predetermined value in correspondence with an increase in vehicle speed.

8. The apparatus according to claim 1, wherein said control means performs said differential speed control for relaxing a limitation of said differential speed in correspondence with an increase in steering angle, and for strengthening said limitation in correspondence with an increase in vehicle speed using the steering angle and the vehicle speed detected by said detection means as parameters, sets a change rate of said limitation to be substantially zero when the steering angle is not more than a predetermined value, and increases the predetermined value in correspondence with an increase in vehicle speed.

9. The apparatus according to claim 1, wherein when said detection means detects a rough-road traveling state, said control means controls to relax a limitation of said differential speed.

10. The apparatus according to claim 1, wherein when said detection means detects a state in which brakes on said vehicle are being activated, said control means controls to strengthen a limitation of said differential speed.

11. The apparatus according to claim 1, wherein when said detection means detects a traveling state on a road with a low-frictional coefficient, said control means controls to strengthen a limitation of said differential speed.

12. The apparatus according to claim 1, wherein in a case where said driven wheels are rear wheels of said vehicle, and where said detection means detects an accelerated state, said control means controls to relax a limitation of said differential speed.

13. The apparatus according to claim 1, wherein in a case where said driven wheels are front wheels of said vehicle, and where said detection means detects an accelerated state, said control means controls to strengthen a limitation of said differential speed.

14. The apparatus according to claim 1, wherein said control means controls to relax a limitation of said differential speed in correspondence with an increase in steering angular velocity detected by said detection means.

15. The apparatus according to claim 1, wherein said control means controls to relax a limitation of said differential speed in correspondence with a turning degree of said vehicle detected by said detection means.

16. The apparatus according to claim 15, wherein said detection means detects the turning degree by a lateral acceleration sensor for detecting a lateral acceleration of said vehicle.

17. The apparatus according to claim 15, wherein said detection means includes a vehicle speed sensor for detecting a vehicle speed, and a steering angle sensor for detecting a steering angle, and obtains the turning degree on the basis of the detected vehicle speed and steering angle.

18. The apparatus according to claim 1, wherein said control means controls to relax a limitation of said differential speed in correspondence with a decrease in road-surface frictional coefficient detected by said detection means.

19. The apparatus according to claim 1, wherein when said detection means detects a traveling state on a road with a low-frictional coefficient, said control means controls not to relax a limitation of said differential speed in a small-steering angle region detected by said detection means, and controls to relax said limitation in a large-steering angle region.

20. A driven wheel differential speed controlling apparatus for a vehicle having a pair of right and left driving wheels and a pair of right and left driven wheels, comprising:

acting means for causing a viscous force of a fluid to act on said driven wheels; and control means for controlling a differential speed between said driven wheels by changing the viscous force of the fluid.

21. The apparatus according to claim 20, wherein said acting means includes a multi-disc viscous clutch extending between axles of said right and left driven wheels.

22. A driven wheel differential speed controlling apparatus for a vehicle having a pair of right and left driving wheels and a pair of right and left driven wheels, comprising:

control means for controlling a differential speed between said driven wheels by changing a viscous force of a fluid, wherein said control means includes a multi-disc viscous clutch extending between axles of said right and left driven wheels and using an electromagnetic viscous fluid, a viscous force of which can be electrically controlled.

23. A driven wheel differential speed controlling apparatus for a vehicle having a pair of right and left driving wheels and a pair of right and left driven wheels, comprising:

acting means for causing one of a fluid pressure and a fluid force to act on said driven wheels; and control means for controlling a differential speed between said driven wheels by changing the one of the fluid pressure and the fluid force.

24. A driven wheel differential speed controlling apparatus for a vehicle having a pair of right and left driving wheels and a pair of right and left driven wheels, comprising:

acting means for causing one of fluid pressures and fluid forces to act on each of said driven wheels; and control means for respectively controlling speeds of said driven wheels by changing the one of the fluid pressure and the fluid forces so as to control a differential speed between said driven wheels.

25. The apparatus according to claim 24, wherein said acting means includes:

a pair of right and left hydraulic pressure pumps coupled to axles of said right and left driven wheels;

fluid paths for connecting fluid action ports and fluid ejection ports of said hydraulic pressure pumps; and control valves respectively arranged midway along said fluid paths.

26. The apparatus according to claim 24, wherein said acting means includes:

a pair of right and left hydraulic pressure pumps/motors coupled to axles of said right and left driven wheels;

fluid paths for connecting between said hydraulic pressure pumps/motors; and control valves arranged midway along said fluid paths.

* * * * *